United States Patent [19]

Bernard et al.

[11] Patent Number: 5,150,853
[45] Date of Patent: Sep. 29, 1992

[54] CRANK-HANDLE FOR A FISHING REEL

[76] Inventors: Jean Bernard, 134 avenue des Lacs, 74300 Scionzier; Jean Ruin, En Bud Thyez, 74300 Cluses, both of France

[21] Appl. No.: 416,518

[22] Filed: Oct. 3, 1989

[30] Foreign Application Priority Data

Oct. 7, 1988 [FR] France ................................ 88 13453

[51] Int. Cl.⁵ ............................................... A01K 89/00
[52] U.S. Cl. ...................................... 242/283; 74/545
[58] Field of Search ............... 242/282, 283, 310, 284; 74/545, 543, 558, 546, 547

[56] References Cited

U.S. PATENT DOCUMENTS

| | | | |
|---|---|---|---|
| 2,438,287 | 3/1948 | Hypnarowski | 242/283 X |
| 3,806,060 | 4/1974 | Valentine | 242/283 X |
| 3,989,204 | 11/1976 | Lemery | 242/283 X |
| 4,138,075 | 2/1979 | Korten | 242/283 |
| 4,155,517 | 5/1979 | Sazaki | 242/284 |
| 4,220,054 | 9/1980 | Kuhlman | 74/545 |
| 4,753,398 | 6/1988 | Myojo | 242/316 |
| 4,830,306 | 5/1989 | Tsunoda et al. | 43/22 |

FOREIGN PATENT DOCUMENTS

| | | | |
|---|---|---|---|
| 0363290 | 4/1990 | European Pat. Off. | 242/283 |
| 2421879 | 11/1974 | Fed. Rep. of Germany | 242/283 |
| 2278257 | 2/1976 | France | 242/284 |

Primary Examiner—Katherine Matecki
Attorney, Agent, or Firm—Ratner & Prestia

[57] ABSTRACT

A crank-handle is divulged for fishing lines including a radial arm connected both to the main rotational shaft journalled in the reel body and to an axial handle mounted for rotation on the arm. The handle comprises a rigid body covered by an interchangeable elastomer sleeve. The radial arm comprises an internal axial portion penetrating inside the handle and having a cross-section greater than or equal to the cross-section of the external axial arm portion.

4 Claims, 4 Drawing Sheets

CRANK-HANDLE FOR A FISHING REEL

BACKGROUND OF THE INVENTION

1. Field of the Invention

The present invention relates to fishing reels comprising a mechanism for recovering the fishing line.

In most fishing reels used at the present time on fishing rods, the nylon fishing line is wound on an axial reel, namely a reel whose axis is substantially parallel to the longitudinal axis of the fishing rod. During operations for recovering the line, it is wound progressively on the reel by a recuperator driven with a rotational movement with longitudinal axis about the reel and driven by a crankshaft whose end forms a handle. To be readily accessible and functional, the crankshaft comprises a radial arm a first end of which carries the main rotational shaft connecting the crank-handle to the reel body and a second end of which carries a handle mounted for rotation on the arm. The main rotational shaft of the crank-handle is substantially perpendicular to the main longitudinal axis of the reel, or longitudinal axis of the fishing rod. The handle is rotatable about a screw forming an axial rotational shaft parallel to the main crank-handle rotational shaft. The result is that the handle occupies a highly prominent position on the side of the fishing rod and of the reel, which makes it readily accessible and functional.

2. Description of the Prior Art

In known fishing reels, such as the one shown in the document FR-A-2 487 637, the handle is formed of a rigid body, of a general flattened parallelepipedic shape, having a throughbore in which a screw is inserted with slight clearance whose head bears on the external face of the handle body and the shank end of which is screwed to the end of the radial crank-handle arm. The handle comprises a bearing face cooperating by sliding with slight play with the end of the crankshaft arm. To permit ready and smooth rotation of the crank-handle, for limiting friction and so as to provide economic manufacture, a sufficient clearance must be left between the handle and the corresponding end of the crankshaft arm. The result is the appearance of a groove at the interface between the handle and the crankshaft arm.

Because of its highly prominent position, the fishing reel crankshaft, and particularly its handle, are likely to be subjected to relatively violent shocks during use of the fishing equipment. Such violent and repeated shocks very often lead to twisting or breaking of the screw connecting the handle to the crankshaft arm. The shocks also lead to damage of the external handle surface, which surface must be in an appropriate condition for preventing the fingers of the user from slipping. The result is an unacceptable deterioration of the handle and of the crankshaft arm.

Furthermore, the annular groove between the crankshaft and the handle leads to specific problems appearing because of the use of fishing reels with a fishing line generally of small section during certain phases of use of the equipment, the fishing line leaving the reel tends to wind itself in the groove between the handle and the crankshaft arm and to be jammed in this groove. The risk of jamming and winding forms a serious and unacceptable drawback.

SUMMARY OF THE INVENTION

The object of the present invention is in particular to avoid the above mentioned drawbacks by providing means absorbing the shocks undergone by the handle and crankshaft arm in a fishing line. Such shock absorption limits the stresses undergone by the connecting screw between the crankshaft handle and the arm, and the stresses undergone by the crankshaft arm itself and by the handle itself.

Another advantage of the present invention resides in the fact that the handle itself is protected by an interchangeable member forming its outer surface, so that damage to the gripping surface of the crank-handle may be eliminated by changing the outer element, without having to change the whole crank-handle.

In an advantageous embodiment, the fishing line of the invention is provided with a special connection between the handle and the crankshaft arm, this connection eliminating the presence of the annular groove in which the fishing line winds itself in known fishing reels.

To attain these objects as well as others, the fishing reel of the present invention comprises a crank-handle including in a known way a handle and a crankshaft arm, the arm comprising an axial portion forming a rotational shaft for the handle passing through a handle bore; according to the invention, the handle comprises a rigid body formed with the throughbore which opens on to the end handle face; the rigid body is covered by an elastomer sleeve covering simultaneously the peripheral faces and the end face of the rigid body. Thus, the handle has properties of mechanically absorbing shocks, it has a deformable and adherent gripping surface and the sleeve prevents the penetration of foreign bodies into the handle throughbore. In one embodiment, the peripheral surface of the rigid body of the handle comprises rough portions cooperating with the internal surface of the sleeve so as to avoid untimely wrenching off of the cap. The cap is fitted under tension on the rigid body and is retained on the body by its resilience so that it is readily interchangeable.

In an advantageous embodiment, the second crankshaft arm end comprises an external axial portion extended by the handle, and of a cross-section SE less than the handle cross-section SP, the handle comprising a shoulder limiting the relative axial movement of the handle in the direction of the arm. In accordance with the invention, the external axial portion of the arm is extended by an axial portion of the arm internal to the handle, of a cross-section SI connected by its first end to the external axial portion end; said shoulder limiting the relative axial movement of the handle in the direction of the arm is formed by the second internal axial portion end; the external axial portion is housed in a an end bore of the handle; the cross-section SE of the external axial portion is less than or equal to the cross-section SI of the external axial portion. Thus, the arm shoulder occupies an intermediate position inside the handle, so that there is no danger of the fishing line being wound and jammed between the arm shoulder and the handle.

BRIEF DESCRIPTION OF THE DRAWINGS

Other objects, features and advantages of the present invention will be clear from the following description of particular embodiments, with reference to the accompanying figures in which.

DESCRIPTION OF THE PREFERRED EMBODIMENTS

Figure 1:
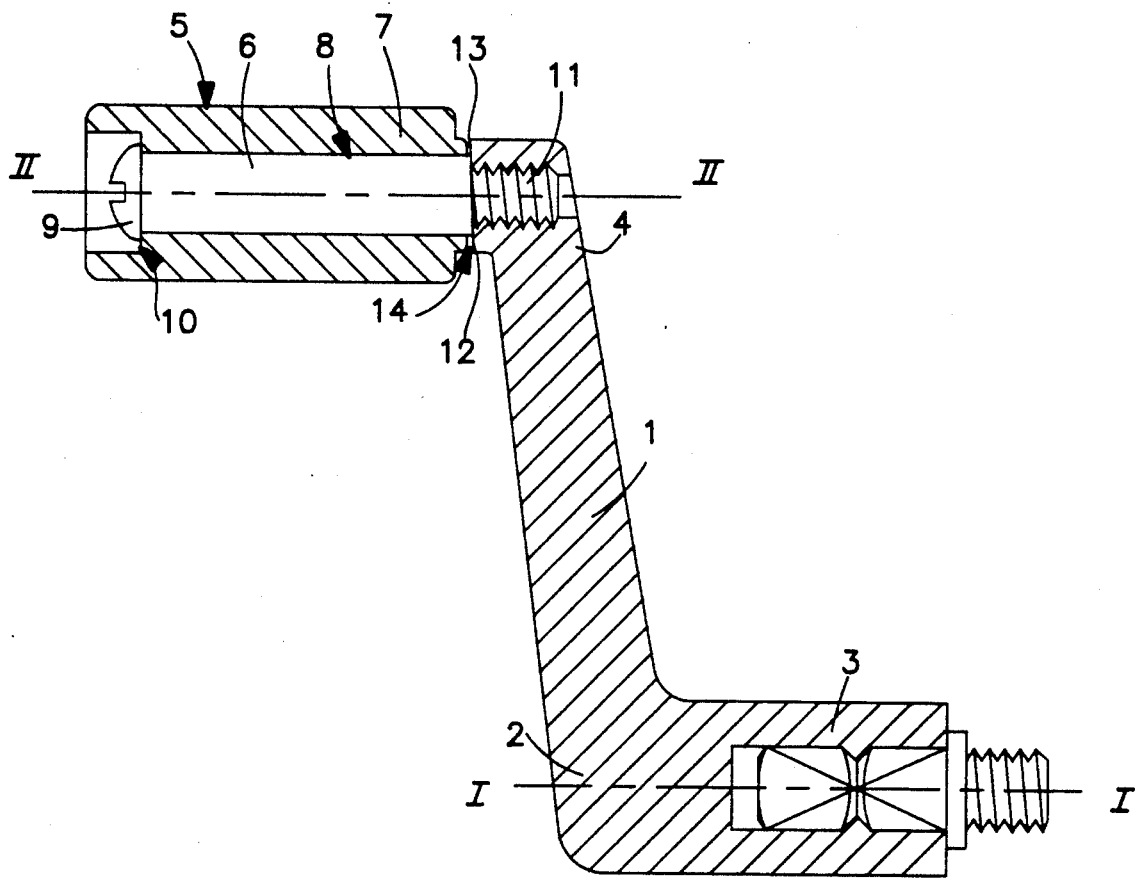
FIG. 1 shows a front view in section of a known fishing reel crank-handle.
Figure 2:
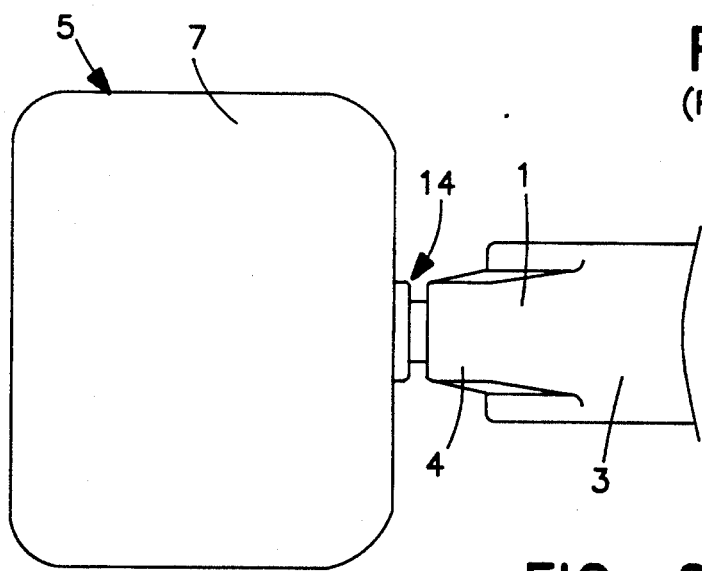
FIG. 2 shows the crank-handle of FIG. 1 in a top view.

FIGS. 1 and 2 are intended to better show the above mentioned problems, which appear in known fishing reels.

These figures illustrate the form of a known fishing reel crank-handle, comprising a radial arm 1, a first end 2 of which carries the main rotational shaft 3 of the crank-handle and the second end 4 of which carries a handle 5 mounted for rotation on the arm by means of an axial handle rotational shaft. The main crank-handle rotational shaft 3 is developed in a direction I—I generally perpendicular to the longitudinal direction of the fishing reel and fishing rod, and is connected to the usual means for winding the line on the fishing reel. The main crank-handle rotational shaft 3 is journalled then in the fishing reel body, not shown in the figures, in a way known per se.

Handle 5 is rotatable about an axis II—II generally parallel to the direction I—I of the main crank-handle rotational shaft, or axial direction.

Handle 5 is generally connected to the radial arm 1 by a shouldered screw 6; handle 5 is formed of a rigid body 7 having an axial throughbore 8; the shouldered screw 6 passes through bore 8 with a slight clearance and its head 9 bears against a first end facet 10 of the rigid body 7 of the crank-handle; end 11 of the screw shank 6 is screwed into a corresponding tapped bore of the second end 4 of the radial arm 1; the intermediate shoulder 12 of screw 6 bears against a facet 13 of the radial arm 1. A sufficient clearance is provided so as to allow a slight axial translational movement of the handle body 7 on the shouldered screw shank 6, between head 9 and the radial arm facet 13. In FIGS. 1 and 2 has been shown the appearance of a peripheral annular groove 14 between the rigid handle body and the second end 4 of the radial arm 1. There is a danger, in certain phases of use of the equipment, that the fishing line becomes wound and jammed in groove 14.

Figure 3:
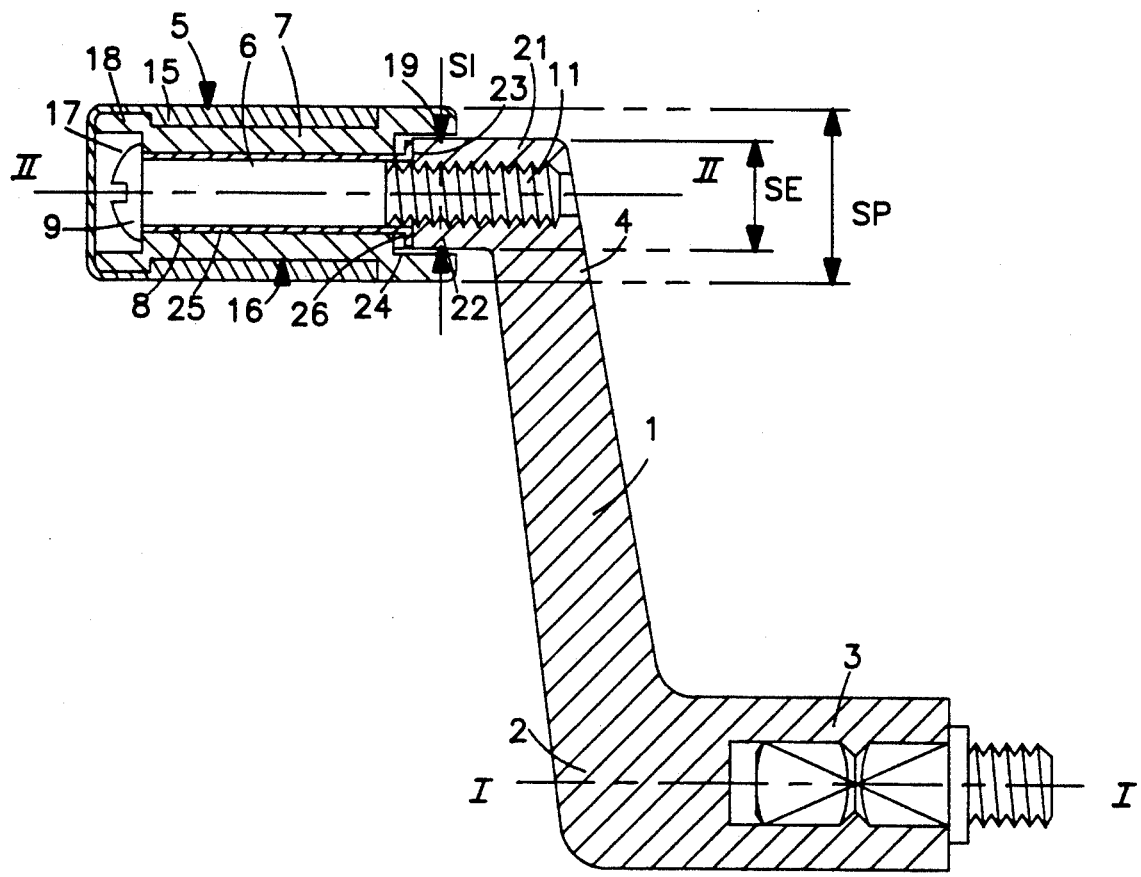
FIG. 3 shows a front sectional view of a fishing reel crank-handle according to the present invention, in a first embodiment.
Figure 4:
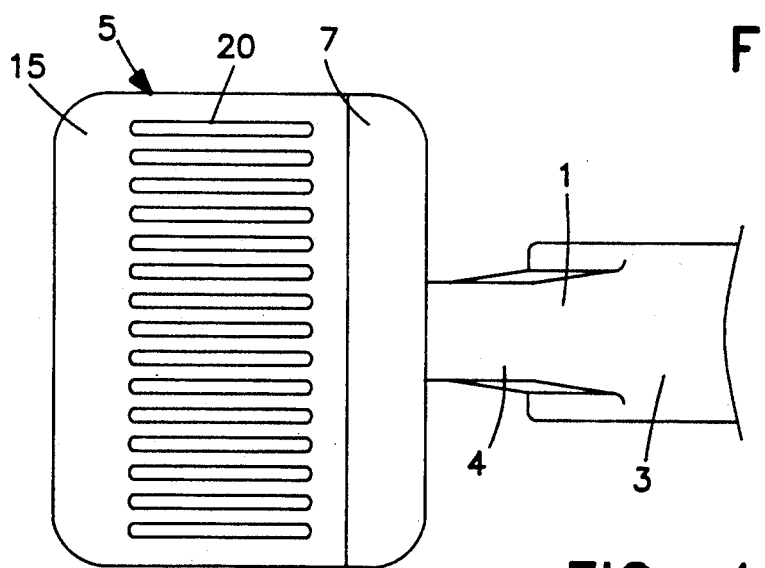
FIG. 4 shows the crank-handle of FIG. 3 in a top view.

In the embodiment shown in FIGS. 3 and 4, the fishing reel of the invention also comprises the main elements of known fishing reel crank-handles shown in FIGS. 1 and 2, which main elements have been kept with the same numeric references, particularly radial arm 1, the main crank-handle rotational shaft 3, handle 5, rigid body 7, connecting screw 6.

However, in this embodiment, the rigid handle body 7 is internal and is covered by an elastomer sleeve 15 covering simultaneously the peripheral faces 16 and the end face 17 of the rigid body 7. During falls, the resilient material sleeve 15 forms a protective layer absorbing the shocks.

It will be readily understood that sleeve 15, which covers the peripheral face 16 of rigid body 7 forms by itself the surface for gripping the crank-handle. The result is that the gripping surface is deformable and adherent, which facilitates handling thereof and makes it particularly agreeable. Sleeve further opposes the penetration of foreign bodies into the handle bore 8, for it forms a continuous and sealed wall covering the end zone occupied by the screw head 9.

The peripheral surface 16 of the rigid body 7 of the handle advantageously comprises rough portions such as end excrescence 18 and the opposite excrescence 19, cooperating with the internal sleeve surface 15 to prevent said sleeve from being wrenched away accidentally. The sleeve is fitted under tension on the rigid body 7 and is retained on the body by the effect of its elasticity. Sleeve 15 is thus readily interchangeable. It comprises, on its peripheral external face, rough portions shown schematically by axial lines 20 in FIG. 4, which increase the adherence between the handle and the fingers of the user. At the end of the fishing season, if said rough portions 20 are worn, this can be easily remedied by changing sleeve 15. In this embodiment shown in FIGS. 3 and 4, the connection between handle 5 and the radial arm 1 is provided by a new and advantageous structure. The second end 4 of radial arm 1 comprises an external axial section 21, extending parallel to the crank-handle axis II—II, which external axial portion 21 is extended by the handle. The external axial portion 21 has a cross-section SE less than the cross-section SP of the handle. The external axial portion 21 of the arm is extended by an internal axial portion 22 of the arm, of cross-section SI, and connected by its first end to the end of the external axial portion 21. The second end 23 of the internal axial portion 22 forms a shoulder limiting the axial movement of handle 5 in the direction of the radial arm 1. The internal axial portion 22 is housed in an end bore 24 of the handle. The cross-section SE of the external axial portion 21 is less than or equal to the cross-section SI of the internal axial portion 22 of the arm. Thus, the shoulder formed by the second internal axial portion end 23, which limits the axial movement of the handle in the direction of the radial arm, occupies an intermediate position inside the handle, namely a position which is non visible and non accessible by the fishing line. The result is that there is no danger of the fishing line being wound and jammed between said shoulder 23 and the handle.

In the embodiment shown, the connection between the handle 5 and radial arm 1 is also provided by an axial screw 6, whose head 9 limits the axial movement of the handle away from arm 1, and whose end 11 is screwed into a tapped bore in the second end 4 of the radial arm. In this embodiment, screw 6 comprises no intermediate shoulder, but cooperates with a shouldered socket 25. Socket 25 comprises a tubular body through which the shank of screw 6 passes, whose first end bears on the screw head 9 and whose second end comprises a socket shoulder 26 forming a bearing surface against the second end 23 of the axial portion 22 of the radial arm 1. Socket 25 limits the distance by which screw 6 is screwed into the tapped bore of the radial arm. The presence of the socket shoulder 26, defining a larger bearing surface, limits the crushing of the material forming the radial arm end when screw 6 is screwed in, and contributes to the shock resistance. Thus, socket 25 bears both on the screw head 9 and on the end shoulder 23 of the radial arm 1. In this embodiment, a slight clearance is left so as to permit a slight axial movement of the rigid handle body 7 on socket 25, between the screw head 9 and the socket shoulder 26.

Preferably, the internal axial portion 22 of the radial arm, or portion penetrating into the handle bore 24, must have a length equal to several times the diameter of the fishing line.

Similarly, preferably, the external axial portion 21 of the radial arm must have a length several times the diameter of the fishing line. Thus, jamming of the fishing line between the handle and the radial arm is avoided.

It will be noted that the connecting structure between handle 5 and the radial arm 1 such as shown in FIG. 3 leads to substantially increasing the length of the radial arm portion 1 into which screw 6 penetrates. This part is in fact formed on the one hand by the external axial portion 21 of the radial arm and also by the internal axial portion 22 of the radial arm. The result is a substantial increase in the mechanical strength of this connection. In the embodiment shown in FIGS. 5 to 7, the connection between handle 5 and radial arm 1 comprises the same elements as in the embodiment of FIG. 3, but further includes resilient means interposed between the axial portion of the arm and the handle, for urging the handle against the base of the screw head 9, opposite the radial arm.

Figure 5:
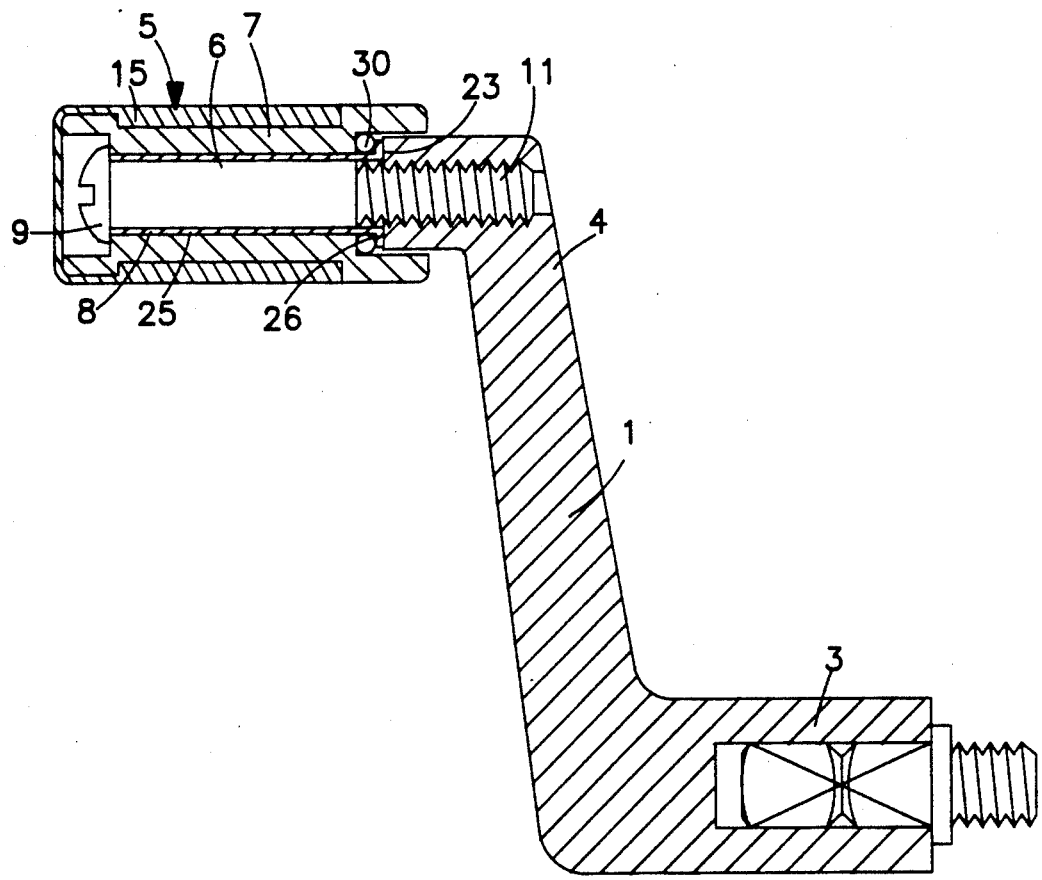
FIG. 5 shows a sectional front view of the fishing reel crank-handle according to the present invention in a second embodiment.

In the embodiment shown in FIG. 5, the resilient means comprise an elastomer O-ring 30, housed between the second end 23 of the internal axial portion 22 of the arm forming a shoulder, and the rigid body 7 of the handle. Tightening of screw 6 causes slight crushing of the O-ring 30, which thus serves as resilient member urging the handle 5 against the screw head 9. It will be noted that the O-ring 30 serves simultaneously as seal, limiting the penetration of foreign bodies into the handle, inside bore 8. Preferably, the O-ring 30 is disposed at the periphery of shoulder 26 of socket 25, so that said shoulder 26 provides centering of the O-ring 30 and limits crushing thereof.

Figure 7:
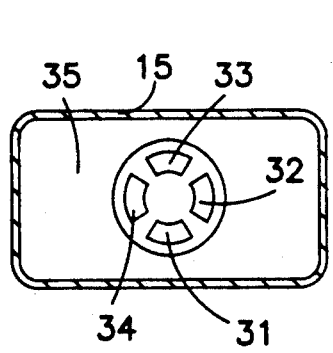
FIG. 7 is a cross-sectional view of the handle through section 7, 7 of FIG. 6.
Figure 6:
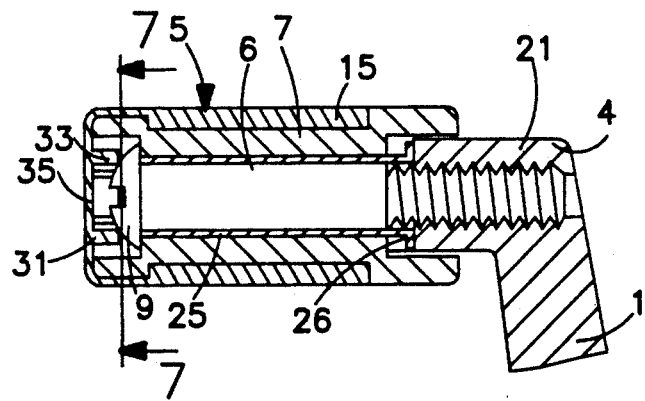
FIG. 6 shows a front sectional view of a fishing reel crank-handle according to the present invention in a third embodiment.
Figure 8:
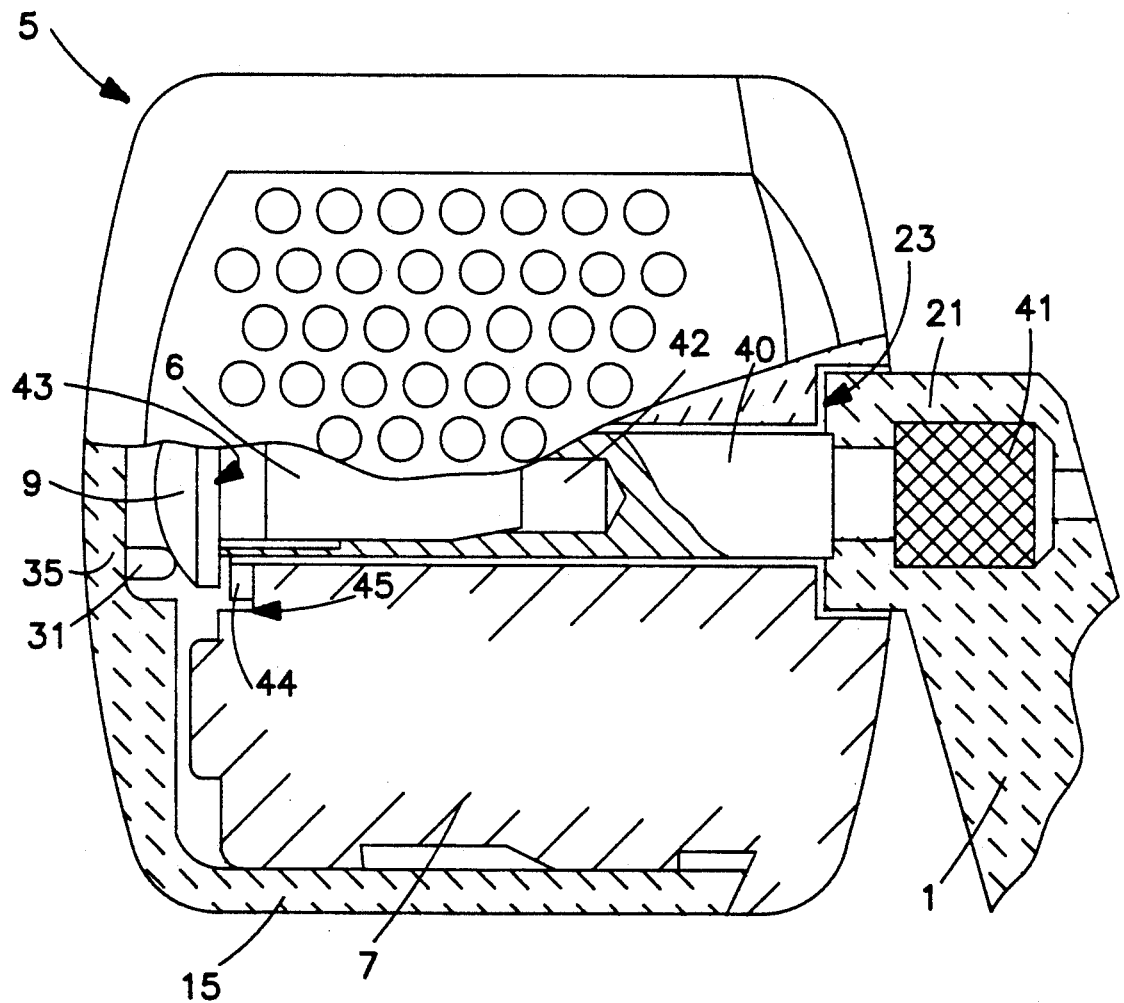
FIG. 8 shows a top sectional view of a fishing reel crank-handle according to the invention in a fourth embodiment.

In the embodiment of FIGS. 6 and 7, the resilient means comprise one or more axial tongues, for example four tongues 31, 32, 33 and 34, projecting from the internal face of the end wall 35 of sleeve 15, and shaped so as to bear resiliently on the external head 9. The resilient tongues 31-34 take up the play in a preferential direction, thus avoiding the chatter effect. In addition, in the case of a lateral shock, the additional deformation generated absorbs the energy.

In the variant shown in FIG. , the handle rotational shaft is formed of a hollow shaft 40 embedded at its first end 41 in the crank-handle arm 1 and comprising at its second end a blind tapped hole 42 into which a screw 6 is screwed having a smooth convex head 9. The connecting surfaces between the axial portion 21 of the radial arm and the handle body are similar to those of the preceding embodiments, i.e. they comprise an external axial portion 21, an internal axial portion 22, a second internal axial portion end 23 forming a shoulder limiting the axial movement of handle 5 in the direction of the radial arm 1. The base 43 of the screw head 9 limits the axial movement of handle 5 away from arm 1. The axial play of handle 5 between the base 43 of the screw head 9 and shoulder 23 is adjusted by means of a washer 44 of appropriate thickness inserted between base 43 of the screw head 9 and the corresponding front face 45 of the rigid body 7 of the handle. A resilient tongue 31, possibly associated with other similar resilient tongues, projects from the internal face of the end wall 35 of the sleeve 45 covering the peripheral faces and the end face of the rigid body 7. The resilient tongue 31 bears against the convex end face of the smooth screw head 9, for urging handle 5 away from arm 1. This variant also takes up play in the preferential direction, avoiding the chatter effect, and permits precise adjustment of the axial play by an appropriate choice of washer 44.

The present invention is not limited to the embodiments which have been explicitly described but includes the different variants and generalizations thereof contained in the scope of the following claims.

What is claimed is:

1. A crank arm for coupling a handle to a main rotational shaft of a fishing reel comprising:
   an arm coupling means on one side of a first end of said arm for attaching said arm to said main rotational shaft of the fishing reel;
   a projection at the other end of said arm and on a side thereof opposite to said one side;
   a handle;
   an end bore in said handle, having a side wall and a planar bottom; and
   a shoulder formed within said end bore and in a plane on said projection; and
   means for mounting said handle on said projection for rotation about an axis perpendicular to said plane for limiting the movement of said handle along said axis perpendicular to said plane toward said arm, said mounting means including resilient means for urging said handle away from said arm.

2. A crank arm as claimed in claim 1, wherein said resilient means includes an O-ring inserted between said shoulder and said planar bottom of said end bore.

3. A crank arm as claimed in claim 1, wherein said means for mounting said handle includes a throughbore in said handle, a screw extending through said throughbore, said screw being threaded into said projection at one end and said screw having a head at the other end having a greater diameter than said throughbore, said crank arm further comprising:
   a sleeve of elastomer material mounted on said handle, said sleeve having an end wall spaced from the head of said screw;
   at least one resilient tongue being part of said sleeve and projecting from said end wall toward said screw; and
   a washer for adjusting axial clearances between said head of said screw and said throughbore, said washer surrounding said screw and being located between the bottom of said end bore and said shoulder.

4. A crank arm for coupling a handle to a main rotational shaft of a fishing reel comprising:
   an arm coupling means on one side of a first end of said arm for attaching said arm to said main rotational shaft of the fishing reel;
   a projection at the other end of said arm and on a side thereof opposite to said one side;
   a handle;
   an end bore in said handle, having a side wall and a planar bottom; and
   a shoulder formed within said end bore and in a plane on said projection;

means for mounting said handle on said projection for rotation about an axis perpendicular to said plane for limiting the movement of said handle along said axis perpendicular to said plane toward said arm, said mounting means further including:
- (a) a throughbore in said handle communicating with the bottom of said end bore,
- (b) a hollow socket mounted within said throughbore, one end of said socket adjacent said shoulder, and
- (c) a screw extending through said hollow socket, one end of said screw threadedly engaging said projection and said screw having a head at the other end adjacent the other end of said socket;

an outwardly extending flange at the end of said hollow socket adjacent said shoulder; and an O-ring of resilient material inserted between the bottom of said end bore and said shoulder and surrounding said flange.

* * * * *